Figure 1:
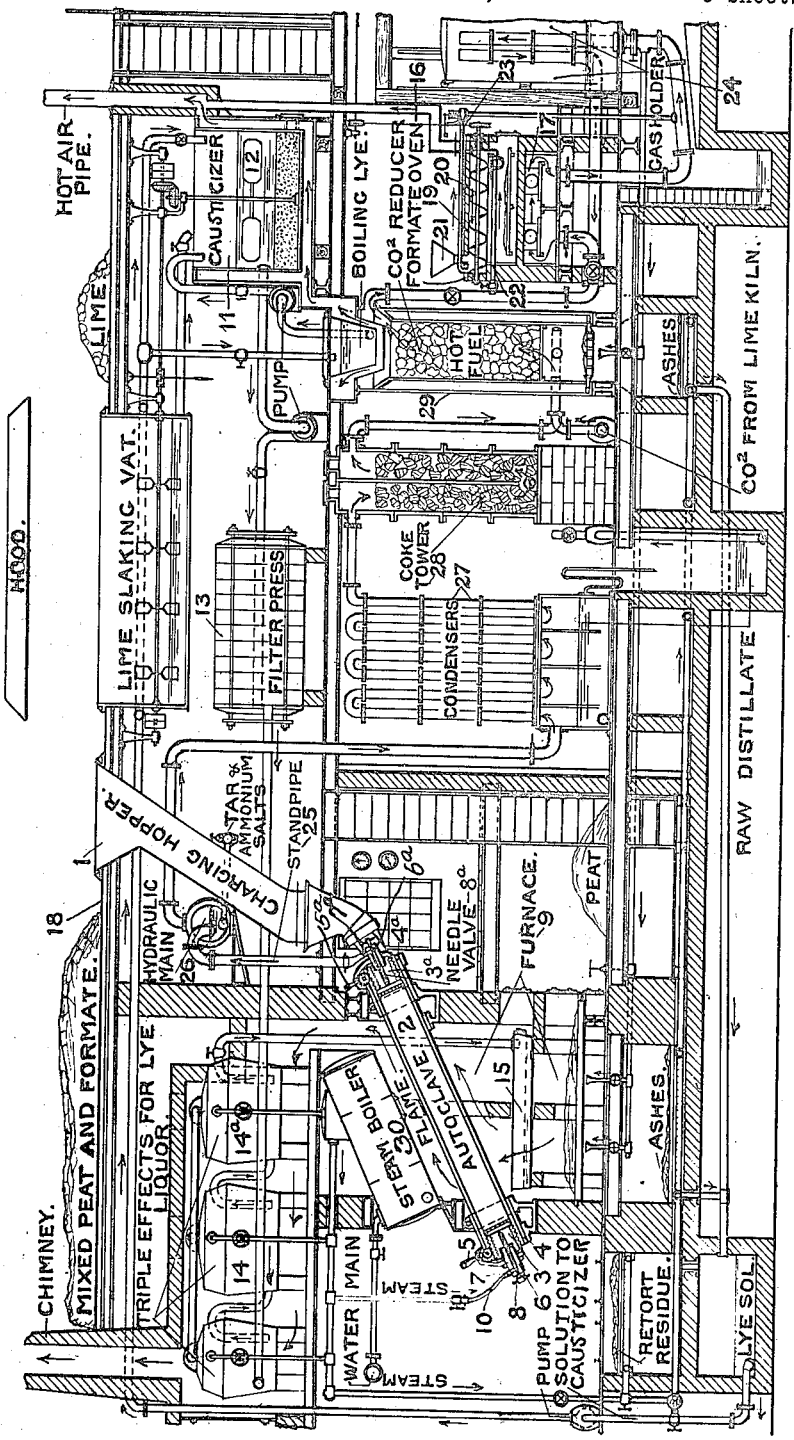

Feb. 13, 1923.

T. ULKE 1,445,423

ART OF AND APPARATUS FOR HYDROGENATING CARBONACEOUS MATERIAL

Filed Feb. 23, 1922     3 sheets-sheet 2

Titus Ulke
Inventor

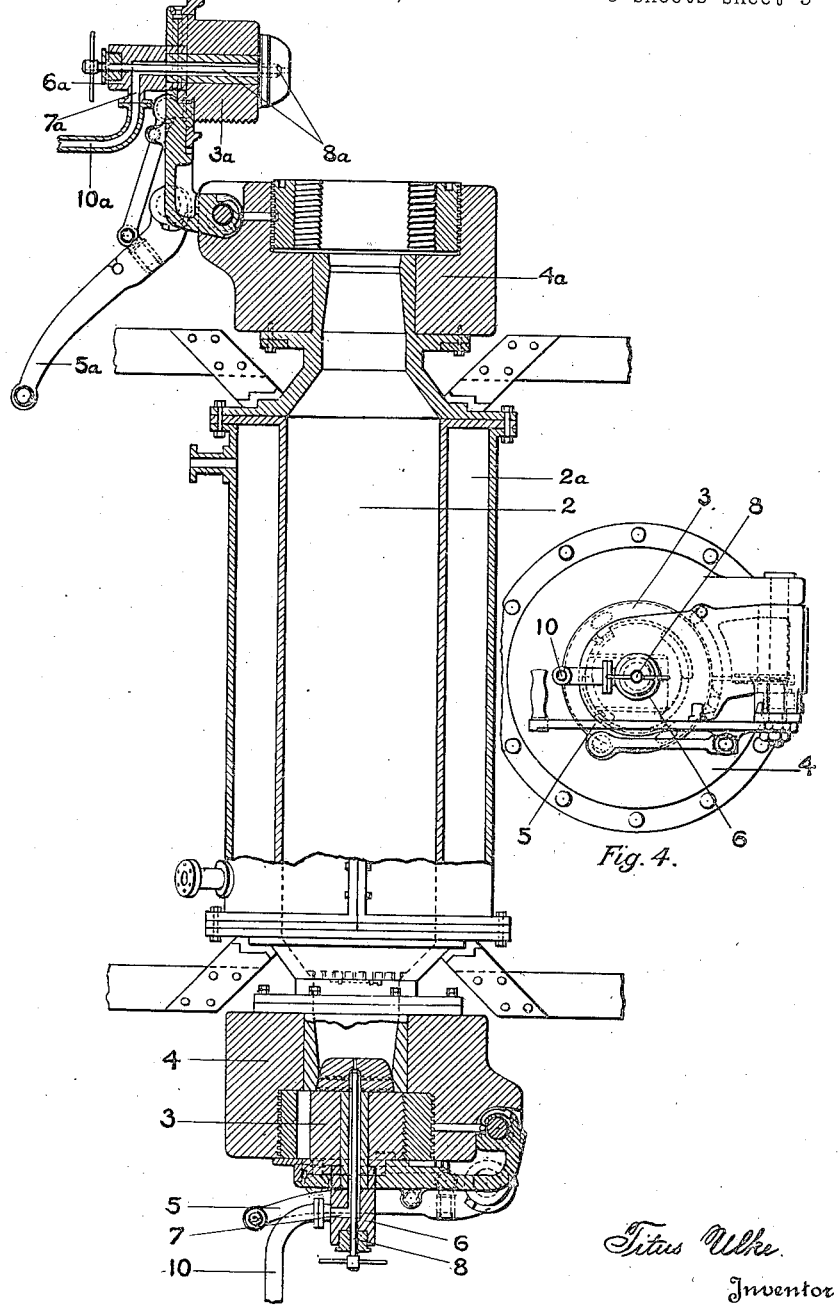

Patented Feb. 13, 1923.

1,445,423

UNITED STATES PATENT OFFICE.

TITUS ULKE, OF WASHINGTON, DISTRICT OF COLUMBIA.

ART OF AND APPARATUS FOR HYDROGENATING CARBONACEOUS MATERIAL.

Application filed February 23, 1922. Serial No. 538,780.

*To all whom it may concern:*

Be it known that I, TITUS ULKE, a citizen of the United States, residing in the city of Washington, District of Columbia, have invented certain new and useful Improvements in or Relating to the Art of and Apparatus for Hydrogenating Carbonaceous Material, of which the following is a specification.

My invention relates to the art of and apparatus for treating any combustible carbonaceous material, such as coal of any kind, bitumen, sawdust, charcoal, carbohydrates, and in particular lignite and peat, for the purpose of recovering higher percentages of marketable fluid hydrocarbons therefrom than are obtained by any of the hitherto practised processes of destructive distillation, and also to produce other valuable organic compounds. The process of this invention is cyclic and comprises a combination of two principal steps, to wit, first subjecting the said carbonaceous material to the hydrogenating action of a substantially solid nascent hydrogen-yielding compound under suitable conditions of heat and pressure, and second regenerating the said compound from some of the reaction products formed as a result of the hydrogenating step, for hydrogenating additional quantities of the said carbonaceous material, substantially without any more of the said hydrogen-yielding compound being required. The cost of the hydrogenating operation is thereby very much reduced, enabling the profitable utilization of certain low grade carbonaceous material not now exploited. The relatively excessive cost of the reagent hydrogen required for reducing such material as peat or lignite, whose reaction products, under the conditions of ordinary destructive distillation, are usually not of a high commercial value, has heretofore militated against the successful employment therewith of hydrogenating methods, such as the processes referred to in the Journal Soc. Chem. Ind. London. Vol. 40 No. 23, Dec. 15, 1921, p. 447, in which is claimed the use of molecular or non-nascent hydrogen and of hydrogen-yielding substances, but the only example of such substances cited is a problematical hydrogen compound of calcium, whose commercial production and utilization is out of the question, or the experimental method described in Breenstoff Chemie, II, pp. 161 and 257, of 1921, in which a commercial product, sodium formate, was used. In all of these actual or experimental processes the relatively expensive hydrogenizing reagent is recovered only partially or not at all, and the possibilities of regeneration are merely hinted at. In another later patented process the use of hydrogen, or of gaseous mixtures containing hydrogen, is specified, although these, according to the inventor, may also be formed within the reaction vessel from substances adapted to give off hydrogen under the working conditions, and the hydrogen containing atmosphere is circulated and returned, yet in order to secure the effect aimed at the patentee admits that it is necessary to circulate a quantity of gas which is considerably in excess of the quantity of hydrogen which is consumed in the reaction process, and in order to avoid the objectionable accumulation of methane, states that it is necessary to draw off either continuously or periodically more or less of the gas contained within the system and substitute therefor a fresh supply of hydrogen. The last cited process thus first requires a considerable excess of hydrogen, and second only contemplates the reuse of a limited portion of the hydrogen evolved, to wit, much less than is required for the hydrogenating step, which necessitates the continuous supply of new quantities of hydrogen to the reaction vessel, and thus makes the regeneration step ineffective.

In view of the prior art cited, that step of the present invention achieving the recovery in a cyclic process of practically the original quantity of hydrogenating reagent employed for continued reuse, and which does not necessitate the use of an excessive quantity of the said reagent, is believed to constitute an important advance in the art of treating carbonaceous material. A further advantage is gained by the utilization of the fuel ashes, produced in sub-steps of the process, as an additional source of alkali carbonate, which is subsequently converted into caustic alkali and then into formate.

Still another advantage of my process resides in the fact that the starting material, such as peat and the like, before its introduction into the reaction vessel, may be mixed with the dry hydrogen-yielding alkali compound, such as formate of sodium, potassium or ammonium, in a comparatively wet condition, the contained moisture serving advantageously to dissolve a portion of the dry formate. Thereby the need of the usual costly drying operation with peat is practically eliminated.

Figure 2:
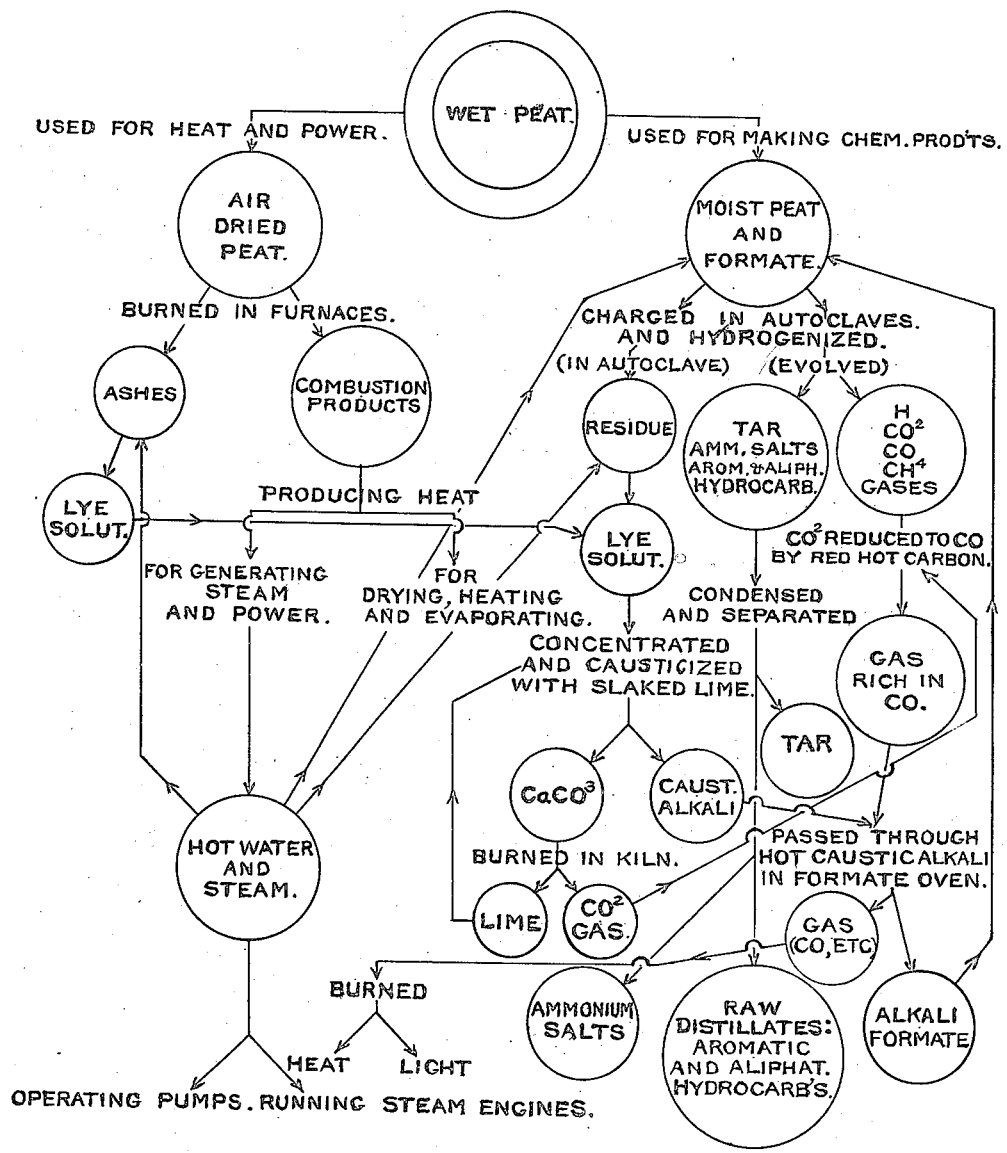

In the drawings, Fig. 1 is a preferred arrangement of plant and apparatus for carrying out this invention. Fig. 2 is a diagram showing the relationship of the steps of my process to one another and indicating the character of the products obtained, taking peat as an example of a suitable starting material. Fig. 3 is a detail view of my autoclave, partly in side elevation and partly in longitudinal section, and Fig. 4 is an end view of the bottom of said apparatus.

When peat is employed, it may be used in a comparatively moist condition, but should be thoroughly incorporated with the hydrogen-yielding compound, such as sodium or ammonium formate, and preferably in the proportion of 1 part of peat to 2 of the formate, in a pug mill or other convenient mixing device. The mixture is then charged through the hopper 1 into an autoclave 2, preferably made of steel capable of withstanding pressures as high as 200 atmospheres and temperatures of as high as 500° C.

The autoclave for effecting the hydrogenation is preferably approximately 22 feet long and of a uniform inner diameter of about 2 feet, with walls 2 inches thick and tight fitting fermetures 3 and 3$^a$, preferably made of steel, at each end, through which the residue is discharged and the mixture of peat and formate is charged, respectively. As each autoclave of a battery is designed to treat ½ ton of macerated peat every 4 to 6 hours, its normal capacity is 2 to 3 tons of peat in 24 hours. The autoclave, to withstand the high pressure required, is reinforced by steel jackets 4 and 4$^a$, shrunk about its ends, or if desired, over its entire length. Both fermetures are of the ordinary interrupted screw thread breech-mechanism type and are each manipulated by a convenient handle 5 and 5$^a$ and lever mechanism in the usual way. Each fermeture or breech-block is tapped centrally and provided with a spindle block 6 and 6$^a$, threaded into the outer third of the breech block, and having a side inlet 7, and outlet 7$^a$, and carrying a centrally placed needle valve 8, and 8$^a$ threaded near its outer end into its spindle block. The inlet 7, controlled by the needle valve 8, serves to admit steam or gas into the autoclave while the outlet 7$^a$, controlled by the needle valve 8$^a$, allows the passage of the hydrogenation products into the standpipe 25 and hydraulic main 26.

The autoclave rests on brackets in an inclined position in a suitable furnace 9 which furnishes the necessary heat, or the heat may be supplied by a steam jacket 2$^a$ as shown in Fig. 3 of the drawings. After the autoclave has been charged it is heated to about 400° C. and this temperature is maintained for at least 3 hours. Steam taken from the boiler 30, or gas containing hydrogen drawn from the gas holder 24 and compressed may be supplied by the pipe 10 at up to say 100 atmospheres pressure to the reaction chamber of the autoclave, as both have been found to exert a favorable influence on the charge. Sodium formate melts upon heating and commences to decompose at about 270° to 360° C., with evolution of hydrogen. Tar begins to come off from lignite at a temperature as low as 320° C., and from peat at a still lower temperature.

When the run has ended the autoclave is allowed to cool, and the residue removed from the lower end, after the fermeture 3 has been opened, and dumped into a pit. As the gray residue contains only a small amount of coke like substance but is chiefly composed of alkali metal carbonate, it, and also the ashes obtained as a residue upon burning fuel under the autoclave and reducer, is leached with hot or preferably boiling water to recover the contained alkaline salt and pumped to a causticizing vat 11 located on the upper floor of the building. There slaked lime mixed with water to the consistency of cream is run into the hot liquor and the mixture agitated by stirring paddles 12. The calcium of the slaked line now replaces the sodium in the sodium carbonate, a white insoluble precipitate of calcium carbonate being formed, while the resulting sodium hydroxide remains in the solution, as indicated by the following reaction:

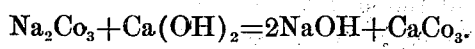

$$Na_2Co_3 + Ca(OH)_2 = 2NaOH + CaCo_3.$$

The solution of sodium hydroxide is decanted off from above the precipitate of calcium carbonate, or if preferred, filter-pressed in the press 13 from the precipitate, and evaporated in triple effects 14 and 14$^a$, until it has come to the desired strength. The evaporation is continued in an iron pan 15, shown below the autoclave, until, at a nearly red-heat, an oily liquid is obtained which solidifies on cooling to a white semi-translucent mass of the composition NaOH, which is broken into suitably small pieces and conveyed to a suitable autoclave or oven 16 in which formate may be produced. When the oven is employed, the caustic soda, which may be mixed with sodium carbonate, is placed in airtight containers or digesters 17, provided with stirring devices, on shelves in the lower section of the oven, the containers or digesters tightly closed, and heated to a temperature of about 120° C., after which hot carbon monixide gas, obtained by the process described later, and occasionally a little steam, is forced through the moist alkali metal hydrate.

As a result of the following reactions:

$$NaOH + CO = NaHCO_2,$$

and $$Na_2CO_3 + 2CO + H_2O = 2NaHCO_2 + CO_2,$$

there is produced sodium formate, which is sent to the charging floor 18 to be mixed with moist peat in a pug mill, not shown, until the mixture is in fit condition for charging into an empty autoclave and hydrogenating treatment, as previously described.

Usually however I prefer to employ an autoclave of the type disclosed in my copending application No. 552,735, or the continuous apparatus indicated in the upper portion of the oven 16 in Fig. 1. A horizontally placed cylindrical vessel 19, provided with a screw conveyor 20 and capable of being made pressure tight, is constantly fed with fresh caustic in small pieces through the hopper 21 and the charge of caustic stirred and slowly moved by the screw conveyor to the right end of the oven, while rich CO gas, heated to from 180° to 220° C., in part by the regulatable fire indicated in Fig. 1 below the horizontal gas intake pipe 22, is forced or led into the vessel at its right end and through the advancing caustic. The spent gas, poor in CO, is passed out from the vessel at its left end into a pipe 23 leading to the gas holder 24. The caustic is gradually converted into formate and the finished product continuously drops through a slide opening near the right end of the vessel 19 into a receiving conveyor, eventually to be delivered upon the peat charging floor 18.

Instead of employing sodium formate as the hydrogenating agent for obtaining fluid hydrocarbons from peat and the like, ammonium formate may be substituted, the latter being readily made in the plant described by combining hot carbon monoxide gas, obtained from carbon dioxide as described hereinafter, and placed under pressure and in a closed digesting vessel, with atomized dilute ammonia, which is recovered from ammonium salts, produced simultaneously with fluid hydrocarbons as products of the hydrogenation, by adding thereto slaked lime.

Thus far essentially only the treatment of the solid residual product of the hydrogenation reaction has been disclosed. The recovery of the evolved gaseous and semiliquid products will now be considered. As all of these products of the reduction distillation are volatile at the high temperature employed, they are allowed to pass out through the pipe 10ª and up the vertical stand pipe 25, into a hydraulic main 26, which contains water and into which the curved upper extremity of the standpipe dips. In this water a portion of the tar and aqueous vapor is condensed and the ammoniacal salts are in part dissolved. The gas then passes alternately up and down through the cooling pipes of the condenser 27 and suffers further condensation, the remaining tar and the liquid hydrocarbons being deposited. The gas is then further purified by passing through a tower 28 filled with fragments of coke over which water trickles, the water absorbing the ammoniacal salts still present. The partly purified gas, which may, for example, contain as much as 35% $CO_2$, is now led into the lower portion of a vertical reducing tower-furnace 29 filled with charcoal and heated, the gas being led upwardly over the hot fuel, whereupon the following reaction takes place: $C + CO_2 = 2CO$.

The carbon monoxide gas may now be passed into the formate oven and led through the moist caustic to form sodium formate, as heretofore described. Whatever gas is not required in the latter step is taken through a by pass under the oven and conveyed to the gas holder 24, and may be drawn off, whenever required, to be returned, after compression, to the hydrogenation autoclave or to be burned, either for the purpose of generating heat or securing light in the plant or outside.

The liquid condensation products of the hydrogenating step comprise chiefly tar, ammonium salts and raw distillates, which are found to contain both aromatic and aliphatic hydrocarbons. The substances may be separated by well known methods which need not be here described.

The precipitated calcium carbonate from the causticizing step may be filter-pressed and washed, to recover adhering caustic alkali metal, and after briquetting burned in a lime kiln to recover the lime required in the causticizing step and also to obtain additional $CO_2$ gas for reduction to CO in the tower furnace 29.

My new process and system is adapted to profitably convert lignite, peat, and bitumen in oil shale, as yet but little utilized in this country, although occurring therein in enormous quantities, in part into aliphatic compounds from which gasoline may be distilled, and aromatic compounds containing benzol, and in part into gases which may furnish light and heat. For this purpose an abandoned coal gas plant in good condition may be utilized by substituting one of my high-pressure autoclaves for each bench of 6 gas retorts of the ordinary type and intercalating a $CO_2$ reducer and a formate producer between the condensation apparatus and the gas holder.

It is to be understood that while I have specifically described the utilization of peat, all other carbonaceous or coal-like or bitumen-like substances many of which have been tried, are believed to be capable of treatment by my process for the recovery of hydrocarbons therefrom.

What I claim is:

1. The method of producing fluid hydrocarbons from solid carbonaceous material, which consists in subjecting the said carbonaceous material at high temperature and pressure to the hydrogenating action of a substantially solid hydrogen-yielding compound which leaves a residue of alkali carbonate, condensing the resultant vapors, regenerating the said hydrogen-yielding compound from a portion of the reaction products, and re-using the said compound for reaction with and hydrogenation of a new portion of the said carbonaceous material.

2. A process of treating carbonaceous material by the cycle of steps comprising hydrogenating carbonaceous material with a nascent-hydrogen-yielding compound which leaves a residue of alkali carbonate, at high temperature and pressure, so as to produce products which are solid, liquid and gaseous at normal temperature and pressure, and then combining modified solid and gaseous products of the reaction to reconstitute the said hydrogen-yielding compound, and adding said compound to and for the purpose of hydrogenizing a new portion of the said carbonaceous material.

3. A process of treating carbonaceous material by the cycle of steps comprising subjecting carbonaceous material to the hydrogenating action of a substantially solid hydrogen-yielding compound which leaves a residue of alkali carbonate, at high pressure and temperature, and then regenerating the said compound from some of the reaction products, and adding said compound to and for the purpose of hydrogenizing a new portion of the said carbonaceous material.

4. A process of treating carbonaceous material by the cycle of steps comprising mixing a suitable carbonaceous material with a nascent-hydrogen-yielding compound, which leaves a residue of alkali carbonate, subjecting the mixture to suitable reaction pressure and temperature, separating the reaction products and chemically combining a portion of the said products so as to reconstitute the said compound and adding it to and for the purpose of hydrogenating a new portion of the said carbonaceous material.

5. A process of treating carbonaceous material by the cycle of steps comprising mixing a suitable carbonaceous material with a hydrogen-yielding compound which leaves a residue of alkali carbonate, that is non-gaseous at normal temperature, subjecting the mixture to suitable reaction pressure and temperature, separating the reaction products, and chemically combining a portion of the said products so as to reconstitute the said hydrogen-yielding compound and adding it to and for the purpose of hydrogenating a new portion of the said carbonaceous material.

6. A process of treating carbonaceous material by the cycle of steps comprising mixing a suitable carbonaceous material with a hydrogen-yielding compound which leaves a residue of alkali carbonate, that is solid at normal temperature, subjecting the mixture to suitable reaction pressure and temperature, separating the reaction products and chemically combining a portion of the said products so as to reconstitute the said hydrogen-yielding compound and mixing it with and hydrogenating a new portion of the said carbonaceous material.

7. A process of obtaining carbon compounds by the cycle of steps comprising hydrogenating suitable carbonaceous material with an alkaline-reacting formate, chemically combining two of the modified products of the hydrogenation to reform the said formate and then using it to hydrogenate a new portion of the said carbonaceous material.

8. A process of treating carbonaceous material by the cycle of steps comprising mixing a suitable carbonaceous material with sodium formate, subjecting the mixture to a high pressure and temperature, passing the volatile products of the reaction through condensing and reduction apparatus so as to obtain ammonium salts, liquid hydrocarbons and carbon monoxide gas, leaching the ash resulting from the hydrogenating reaction and causticizing the resultant solution with slaked lime to obtain sodium hydrate and combining the said hydrate and the said carbon monoxide to produce sodium formate and mixing the resultant alkali formate with and for the purpose of hydrogenating a new portion of the said carbonaceous material.

9. A process of treating peat by the cycle of steps comprising mixing moist peat with alkali formate, subjecting the mixture to a high pressure and temperature, passing the volatile products of the reaction through condensing and reduction apparatus so as to obtain ammonium salts, liquid hydrocarbons and carbon monoxide gas, leaching the residual ash and causticizing the resultant solution with slaked lime to obtain alkali hydrate, and combining the said hydrate and the said carbon monoxide gas to produce alkali formate and mixing the resultant alkali formate with and for the purpose of hydrogenating a new portion of peat.

10. A process of treating peat to secure a high yield of liquid carbon compounds consisting in the cycle of steps comprising hydrogenizing peat with sodium formate at a pressure of about 100 atmospheres and a temperature of about 400° C., collecting the products of the reaction and treating them to obtain carbon monoxide gas and solid sodium hydrate, and regenerating said sodium formate by combining the said carbon monoxide gas and sodium hydrate by treatment of reaction products of the hydrogenating step and using the regenerated formate to hydrogenate a new charge.

11. A process of treating peat consisting in the cycle of steps comprising mixing 1 part of moist peat with 2 parts of sodium formate, subjecting the mixture to a temperature of about 400° C. and a pressure of about 100 atmospheres, collecting and separating the reaction products, including carbon dioxide and sodium carbonate, and regenerating not substantially less than the originally used quantity of said sodium formate by combining carbon monoxide gas obtained by reducing said carbon dioxide with carbon and sodium hydrate obtained by causticizing said sodium carbonate with slaked lime and using the regenerated formate to hydrogenate a new charge.

12. In the art of hydrogenating carbonaceous material at high temperature and pressure with alkali formate so as to obtain fluid products including carbon dioxide and a solid residue containing alkali carbonate, the steps of leaching the said residue as well as the ashes secured by burning a portion of said carbonaceous material to obtain the said high temperature, and causticizing the resulting solutions with slaked lime to obtain caustic alkali, reducing said carbon dioxide with carbon to obtain carbon monoxide, and the step of combining the said caustic alkali with the said carbon monoxide, to form alkali formate and using the regenerated formate to hydrogenate a new charge.

13. Apparatus for hydrogenating carbonaceous material with regeneration of the hydrogenating reagent which consists of an autoclave in which the hydrogenating is effected, in combination with means for condensing liquid and gaseous reaction products of the hydrogenation and communicating with said autoclave, reducing apparatus for converting carbon dioxide gas to carbon monoxide gas and communicating with said condensing apparatus, and means for combining said monoxide with an alkaline base obtained from the solid reaction product of the hydrogenation to produce the said hydrogenating reagent and communicating with said reducing apparatus.

14. Apparatus for hydrogenating carbonaceous material with regeneration of the hydrogenating reagent which consists of a reaction vessel for effecting the hydrogenation, in combination with means for condensing liquid and gaseous reaction products of the hydrogenating operation and communicating with said reaction vessel, reducing apparatus for converting carbon dioxide contained in the uncondensed gaseous portion of the reaction products to carbon monoxide gas and communicating with said condensing apparatus and means for reforming said hydrogenating reagent in communication with said reducing apparatus.

TITUS ULKE.